(12) United States Patent
Biggs et al.

(10) Patent No.: US 7,467,229 B1
(45) Date of Patent: *Dec. 16, 2008

(54) METHOD AND APPARATUS FOR ROUTING OF NETWORK ADDRESSES

(75) Inventors: Brent Biggs, Des Moines, WA (US);
Jason Rudolph, Seattle, WA (US)

(73) Assignee: Direct Route, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/868,220

(22) Filed: Oct. 5, 2007

Related U.S. Application Data

(63) Continuation of application No. 11/765,961, filed on Jun. 20, 2007.

(51) Int. Cl.
*G06F 15/16* (2006.01)

(52) U.S. Cl. .......................... 709/242; 370/392; 726/15

(58) Field of Classification Search ................ 709/242; 370/401, 392, 389, 356, 252; 726/15
See application file for complete search history.

(56) References Cited

U.S. PATENT DOCUMENTS

| | | | |
|---|---|---|---|
| 7,099,912 | B2 | 8/2006 | Ishizaki et al. |
| 7,159,031 | B1 | 1/2007 | Larkin et al. |
| 2002/0152373 | A1 | 10/2002 | Sun et al. |
| 2002/0186698 | A1* | 12/2002 | Ceniza ........................ 370/401 |
| 2003/0152068 | A1* | 8/2003 | Balasaygun et al. ......... 370/356 |
| 2004/0004955 | A1 | 1/2004 | Lewis |
| 2004/0218611 | A1* | 11/2004 | Kim ............................. 370/401 |
| 2005/0138204 | A1* | 6/2005 | Iyer et al. .................... 709/242 |
| 2005/0276232 | A1 | 12/2005 | Ito et al. |
| 2006/0167985 | A1 | 7/2006 | Albanese et al. |
| 2007/0083528 | A1 | 4/2007 | Matthews et al. |
| 2007/0086449 | A1* | 4/2007 | Huang et al. ................ 370/389 |
| 2007/0248091 | A1* | 10/2007 | Khalid et al. ............... 370/392 |

OTHER PUBLICATIONS

Configuring IP addressing, Cisco Documentation, pp. 1-43, Dec. 12, 2005.*
Strahler, O.; "Network Based VPNs; GSEC Practical Requirements", v. 1.4b; Aug. 2002; SANS Institute 2003.

* cited by examiner

*Primary Examiner*—Jungwon Chang
(74) *Attorney, Agent, or Firm*—Schwabe, Williamson & Wyatt, P.C.

(57) ABSTRACT

Methods and apparatuses for a management console to configure a router and one or more servers to route and bind network addresses respectively are described herein. In various embodiments, the management console may configure one or more servers of one or more local area networks, each of the one or more servers coupled to the management console, to route one or more network addresses to a router remotely disposed from the one or more servers, the routing to be through one or more networking tunnels through one or more networks correspondingly coupling the one or more servers to the router communicatively. Also, in some embodiments, the management console may configure the router to route the one or more network addresses to at least one recipient server coupled to the router for binding to the at least one recipient server, the at least one recipient server being also remotely disposed from the one or more servers.

8 Claims, 3 Drawing Sheets

METHOD AND APPARATUS FOR ROUTING OF NETWORK ADDRESSES

RELATED APPLICATION

This application is a continuation of U.S. patent application Ser. No. 11/765,961 filed on Jun. 20, 2007, and entitled "METHOD AND APPARATUS FOR ROUTING OF NETWORK ADDRESSES".

FIELD

The present invention relates generally to computer networking. More specifically, the present invention relates to configuring servers to route network addresses to a router through a networking tunnel, and to configuring the router to route the network addresses to a recipient server.

BACKGROUND

Routing across the Internet and other public and private wide area networks (WANs) often requires use of a number of well-known routing protocols, such as the Border Gateway Protocol (BGP). These routing protocols allow multiple autonomous systems to operate in a decentralized, connected fashion, removing the need for an Internet backbone network. Such protocols require implementation of large routing tables, however, and thus involve significant overhead. To avoid this overhead, enterprises often rely on direct, point-to-point links acquired from a telecommunication provider. These links often involve a substantial amount of set-up work, however.

Routing network addresses, such as Internet Protocol (IP) addresses, from one server to another, remotely disposed server is often achieved though a direct, point-to-point link.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

Illustrative embodiments of the present invention include but are not limited to methods and apparatuses for a management console to configure a router and one or more servers to route and bind network addresses respectively. In various embodiments, the management console may configure one or more servers of one or more local area networks, each of the one or more servers coupled to the management console, to route one or more network addresses to a router remotely disposed from the one or more servers, the routing to be through one or more networking tunnels through one or more networks correspondingly coupling the one or more servers to the router communicatively. Also, in some embodiments, the management console may configure the router to route the one or more network addresses to at least one recipient server coupled to the router for binding to the at least one recipient server, the at least one recipient server being also remotely disposed from the one or more servers.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
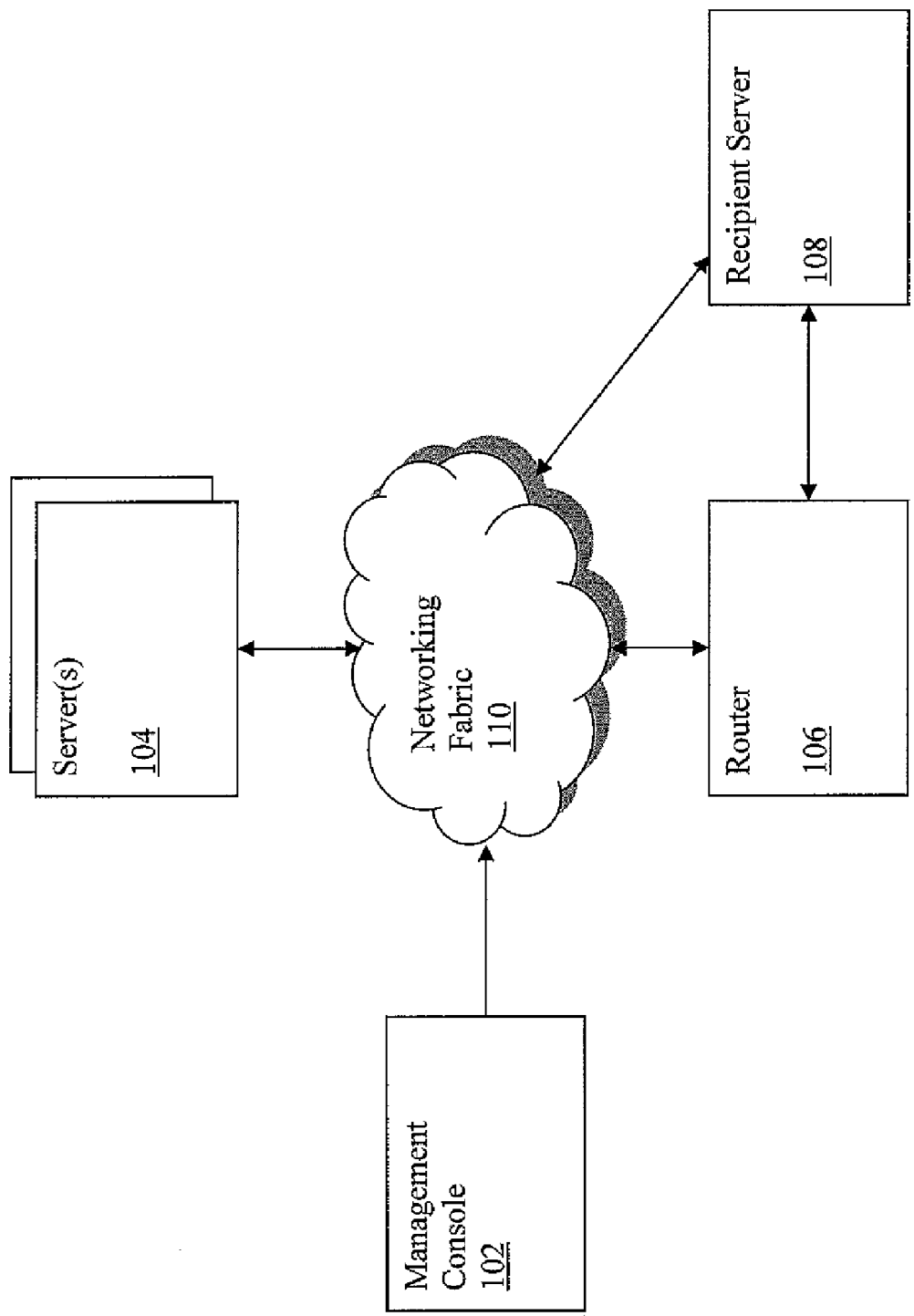
FIG. 1 illustrates an overview of the invention, in accordance with various embodiments.

FIG. 1 illustrates an overview of the invention, in accordance with various embodiments. As illustrated, a management console 102 may configure one or more servers 104 and a router 106. The management console 102 may be connected to one or both of the servers 104 and router 106 through a networking fabric 110. Server 104 and router 106 may also be remotely disposed from each other and may be connected via networking fabric 110. The management console 102 may configure the servers 104 to route one or more network addresses of the servers 104 to the router 106 through one or more networking tunnels communicatively coupling the router 106 and server 104. Also, the management console may configure the router 106 to route the one or more network addresses to at least one recipient server 108 for binding to at least one recipient server 108. The router 106 may be coupled to the at least one recipient server 108 directly, through networking fabric 110, or through some other networking fabric.

Figure 3:
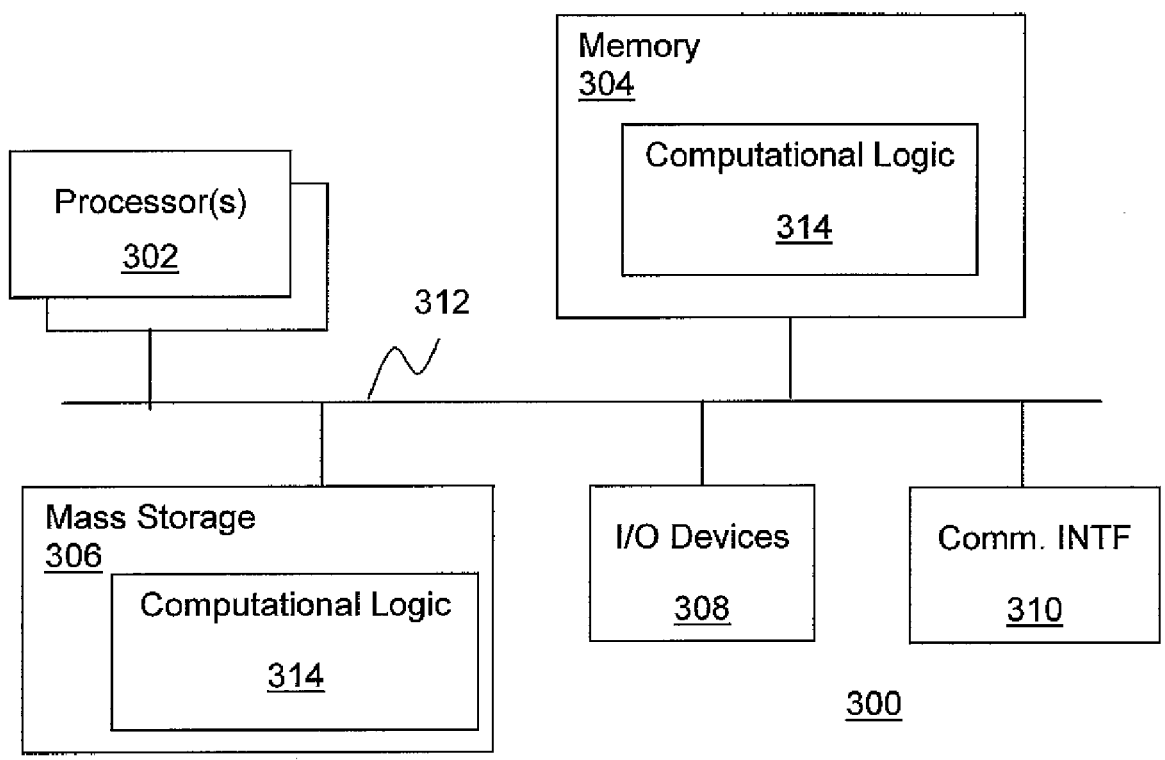
FIG. 3 illustrates an exemplary computing device capable of performing the operations of various embodiments of the present invention.

In various embodiments, management console 102, each of servers 104, router 106, and recipient server 108 may each comprise any single- or multi-processor or processor core central processing unit (CPU) computing system. In other embodiments, management console 102 may be implemented entirely or in part on the same computing system(s) as router 106 and/or one of servers 104. Each of management console 102, router 106, recipient server 108, and each server 104 may be a personal computer (PC), a workstation, a server, a router, a mainframe, a modular computer within a blade server or high-density server, a personal digital assistant (PDA), an entertainment center, a set-top box, a media player, or a mobile device. Each may be capable of operating a plurality of operating systems (OS) in a plurality of virtual machines using virtualization technologies. An exemplary single-/multi-processor or processor core computing system is illustrated by FIG. 3, and is described in greater detail below. Hereinafter, including in the claims, processor and processor core shall be used interchangeable, with each term including the other.

As illustrated, server 104 and router 106 may be connected to a networking fabric 110. In some embodiments, either or both of management console 102 and/or recipient server 108 may also be connected to networking fabric 110. Networking fabric 110 may be any sort of networking fabric known in the art, such as one or more a wide area network (WAN), and the Internet. In addition to one or more WANs, the Internet, or both, networking fabric 110 may also include a local area network (LAN), in some embodiments. Management console 102, servers 104, router 106, and/or recipient server 108 may communicate via networking fabric 110 and may further use any communication protocol known in the art, such as the Hypertext Transfer Protocol (HTTP), and any transport protocol known in the art, such as the Transmission Control Protocol / Internet Protocol (TCP/IP) suite of protocols.

In various embodiments, as described above, management console 102 may be separate and distinct from servers 104 and router 106, may be directly coupled to one of the servers 104 or router 106, or may be implemented in one of the servers 104 or router 106. Management console 102 may be adapted to program one or both of servers 104 or router 106, providing instructions and/or data capable of configuring the servers 104 and/or router 106. The instructions and/or data provided by the management console 102 may enable the servers 104 to establish one or more networking tunnels to router 106 and to route network addresses to through the tunnels to router 106, and may enable router 106 to establish the one or more networking tunnels, and to route the network addresses to at least one recipient server 108 for binding to at least one recipient server 108. In some embodiments, management console 102 may provide a control interface to facilitate a user in controlling the configuring of servers 104 and/or router 106. In one embodiment, enterprise(s) associated with one or both of servers 104 and/or recipient server 108 may subscriber to a service offered by an enterprise associated with management console 102. Such a service may involve the routing of the network addresses from servers 104 to recipient server 108 via router 106. In some embodiments, router 106 may be associated with the same enterprise as management console 102. In other embodiments, router 106 may be associated with the same enterprise as servers 104 or recipient server 108.

In some embodiments, one or more servers 104 may be servers 104 of one or more LANs (not shown). Servers 104 may provide any sort of service known in the art, such as web services, application services, etc. Servers 104, in addition to be connected to one or more LANs, may also be connected to networking fabric 110 and thus may be accessible to router 106. Servers 104 may each have one or more network addresses, such as Internet Protocol (IP) addresses. For example, a server 104 may have a primary IP address of 66.249.2.18 and additional IP addresses ranging from 66.249.2.19 to 66.249.2.22.

As mentioned, servers 104 may receive instructions and/or data from management console 102 to configure servers 104 to establish one or more networking tunnels to router 106. Such tunnels may communicatively couple router 106 and servers 104. In one embodiment, the networking tunnels may include at least one of a GRE tunnel or a IPIP tunnel. For example, the following exemplary instructions may be provided to servers 104 by management console 102, and may be executed to by a server 104 establish a tunnel with a router 106, the router 106 having an IP address of 216.10.73.50, the tunnel being between that address and the above exemplary primary IP address of a server 104:

modprobe ip_gre
    echo 1>/proc/sys/net/ipv4/ip_forward
    ip tun add node1 mode gre remote 216.10.73.50 local 66.249.2.18 ttl 255
    ip link set node1 up
    ip addr add 192.168.1.2/30 dev node1

Together with a similar set of instructions executed by router 106, the above instructions, when executed, establish a networking tunnel connecting a server 104 to router 106. In some embodiments, the instructions further assign each of the executing server 104 and router 106 private network addresses to facilitate communication between the server 104 and router 106 through the networking tunnel. In the above example instructions, the server 104 is assigned a private IP address of 192.168.1.2. These private network addresses may allow the server 104 and router 106 to communicate with each other directly, as if they were local to each other, and thus may allow the server 104 to route one or more of its network addresses to router 106.

In various embodiments, in addition to providing instructions and/or data to configure servers 104 to establish one or more networking tunnels, management console may also provide servers 104 with instructions and/or data to route network addresses through the established networking tunnels. When received, server 104 may execute the instructions and route the network addresses. Continuing with the above set of examples, the following exemplary instructions, when executed by a server 104, may cause its network addresses, 66.249.2.19 through 66.249.2.22 to be routed to router 106:

ip route add 66.249.2.19 via 192.168.1.1
    ip route add 66.249.2.20 via 192.168.1.1
    ip route add 66.249.2.21 via 192.168.1.1
    ip route add 66.249.2.22 via 192.168.1.1

As is further illustrated, router 106 may be connected to networking fabric 110. Router 106 may also have an IP address, such as the exemplary IP address (216.10.73.50) mentioned above. In one embodiment, router 106 may be a service-specific computing system, tasked solely with receiving and routing networking addresses between servers 104 and recipient server 108, as well as between other sets of servers. In other embodiments, router 106 may also act as a server providing web services, application services, etc.

As mentioned, router 106 may receive instructions and/or data from management console 102 to configure router 106 to establish one or more networking tunnels to servers 104. Continuing with the above examples, the following exemplary instructions may be provided to router 106 by management console 102, and may be executed to by a router 106 establish a tunnel with a server 104:

modprobe ip_gre
    echo 1>/proc/sys/net/ipv4/ip_forward
    ip tun add node1 mode gre local 216.10.73.50 remote 66.249.2.18 ttl 255
    ip link set node1 up
    ip addr add 192.168.1.1/30 dev node1

Together with a similar set of instructions executed by a server 104, described above, the instructions, when executed, may establish a networking tunnel connecting a server 104 to router 106. And, as is also mentioned above, the instructions may further assign each of the executing server 104 and router 106 private network addresses to facilitate communication between the server 104 and router 106 through the networking tunnel. In the above example instructions, the router 106 is assigned a private IP address of 192.168.1.1. In various embodiments, router 106 may receive the network addresses through the one or more networking tunnels, once established.

In some embodiments, router 106 may further receive instructions and/or data from management console 106 that, when executed, cause router 106 to route the network addresses to the at least one recipient server 108 for binding to the at least one recipient server 108. Continuing with the above examples, the following instructions may route the network addresses to the at least one recipient server 108, assuming that recipient server 108 is on vlan 82:

```
vconfig add eth0 82
ifconfig eth0.82 0.0.0.0
ip route add 66.249.2.18 via 'ip route show I grep default I
    gawk '{print $3}''
ip route del table 1
ip route add via 192.168.1.2 table 1
ip rule del from 66.249.2.19
ip rule del from 66.249.2.20
ip rule del from 66.249.2.21
ip rule del from 66.249.2.22
ip rule add from 66.249.2.19 table 1
ip rule add from 66.249.2.20 table 1
ip rule add from 66.249.2.21 table 1
ip rule add from 66.249.2.22 table 1
ip route add 66.249.2.19 dev eth0.82
ip route add 66.249.2.20 dev eth0.82
ip route add 66.249.2.21 dev eth0.82
ip route add 66.249.2.22 dev eth0.82
```

As is further shown, the at least one recipient server 108 may receive the network addresses of servers 104 via router 106. And as described above, router 106 may be coupled to recipient server 108 via networking fabric 110, via other networking fabric, such as a LAN or virtual LAN, or via direct physical coupling. Recipient server 108 may be connected to an additional LAN (not shown), the additional LAN being separate and distinct from the LAN of servers 104. In the series of examples above, if recipient server 108 is on vlan82, recipient server 108 will receive the network addresses of servers 104 from router 106. After receiving the network addresses, recipient server 108 may bind the network addresses and will be able to treat the network addresses as if they are local to recipient server 108.

Figure 2:
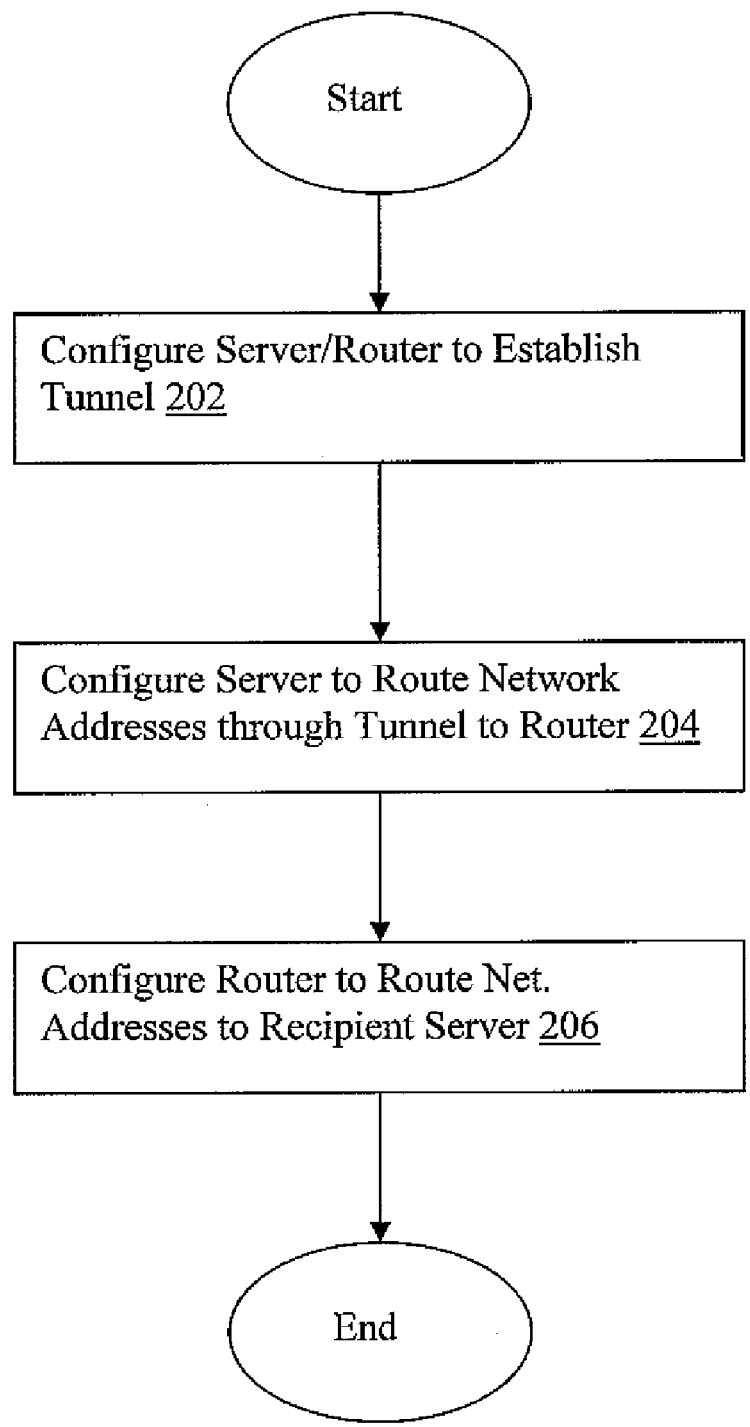
FIG. 2 is a flow chart depicting various embodiments of the invention.

FIG. 2 is a flow chart depicting various embodiments of the invention. As illustrated, a management console may configure one or more servers of one or more local area networks and a router. In other embodiments, also represented by the flow chart, a device other than the management console may perform all or part of the illustrated configuring operations.

As is shown, the management console may configure the one or more servers and/or the router to establish one or more networking tunnels through one or more networks correspondingly coupling the one or more servers to the router communicatively, block 202. In some embodiments, the management console may be coupled to each of the one or more servers, and the router may be remotely disposed from the servers. Also, in various embodiments, the router and servers may be connected via the Internet, and the management console may be connected to each of the one or more servers and the router through the Internet. In one embodiment, at least one of the one or more networking tunnels may be one of a GRE tunnel or an IPIP tunnel. Further, in some embodiments, configuring the router and/or the servers to establish the one or more networking tunnels, block 202, may include configuring the router and/or the servers to assign each of the one or more servers and the router a private network address to facilitate communication between the one or more servers and the router through the one or more networking tunnels.

In various embodiments, the management console may also configure the one or more servers to route one or more network addresses to the router through the one or more networking tunnels, block 204. In some embodiments, the one or more network addresses may comprise a range of Internet Protocol addresses.

As is also shown, the management console may configure the router to route to at least one recipient server coupled to the router the one or more network addresses for binding to the at least one recipient server, the at least one recipient server being also remotely disposed from the one or more servers, block 206. In some embodiments, the at least one recipient server may belong to a recipient local area network, the recipient local area network being different from the one or more local area networks.

FIG. 3 illustrates an exemplary computing device capable of performing the operations of various embodiments of the present invention. As shown, computing system/device 300 may include one or more processors 302, and system memory 304. Additionally, computing system/device 300 may include mass storage devices 306 (such as diskette, hard drive, CDROM and so forth), input/output devices 308 (such as keyboard, cursor control and so forth) and communication interfaces 310 (such as network interface cards, modems and so forth). The elements may be coupled to each other via system bus 312, which represents one or more buses. In the case of multiple buses, they may be bridged by one or more bus bridges (not shown).

System memory 304 and mass storage 306 may be employed to store a working copy and a permanent copy of the programming instructions implementing one or more aspects of the above described teachings to practice the present invention, such as computational logic 314. The programming instructions may be implemented in assembler instructions supported by processor(s) 302 or high level languages, such as C, that may be compiled into such instructions.

The permanent copy of the programming instructions may be placed into permanent storage 306 in the factory, or in the field, through e.g. a distribution medium (not shown) or through communication interface 310 (from a distribution server (not shown)).

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. In one embodiment, a part or all of the operations described as being performed through the management console 102 may be performed directly on the servers 104 and/or router 106 (via one or more services disposed on the devices respectively). Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method comprising:
    configuring one or more servers of one or more local area networks, by a management console coupled from outside the one or more local area networks to each of the one or more servers via one or more networks, to route packets with one or more public network addresses associated with the one or more servers as destination addresses to a router remotely disposed in another local area network, the routing to be through one or more networking tunnels through the one or more networks correspondingly coupling the one or more servers to the router communicatively, and the one or more public network addresses including a range of Internet Protocol addresses, wherein the one or more networking tunnels employ corresponding private addresses and an unauthenticated communication protocol to communicatively couple the one or more servers to the router; and configuring the router, by the management console, to route said packets with the one or more public network addresses as destination addresses to at least one recipient server coupled to the router and located in the another local area network for processing by the at least one recipient server.

2. The method of claim 1, further comprising configuring, by the management console, the one or more servers and/or the router to establish the one or more networking tunnels.

3. The method of claim 2, wherein the establishing includes assigning each of the one or more servers and the router a private network address to facilitate communication between the one or more servers and the router through the one or more networking tunnels.

4. The method of claim 1, wherein the one or more servers and the router are connected via the Internet.

5. A management console comprising:

a processor; and logic operated by the processor and adapted to:

configure one or more servers of one or more local area networks, each of the one or more servers via one or more networks coupled from outside the one or more local area networks to the management console, to route packets with one or more public network addresses associated with the one or more servers as destination addresses to a router remotely disposed in another local area network, the routing to be through one or more networking tunnels through the one or more networks correspondingly coupling the one or more servers to the router communicatively, and the one or more public network addresses including a range of Internet Protocol addresses, wherein the one or more networking tunnels employ corresponding private addresses and an unauthenticated communication protocol to communicatively couple the one or more servers to the router; and configure the router to route said packets with the one or more public network addresses as destination addresses to at least one recipient server coupled to the router and located in the another local area network for processing by the at least one recipient server.

6. The management console of claim 5, wherein the logic is further adapted to configure the one or more servers and/or the router to establish the one or more networking tunnels.

7. The management console of claim 6, wherein the logic is further adapted to assign each of the one or more servers and the router a private network address to facilitate communication between the one or more servers and the router through the one or more networking tunnels.

8. The management console of claim 5, wherein the one or more servers and the router are connected via the Internet.

* * * * *

(12) EX PARTE REEXAMINATION CERTIFICATE (8021st)
United States Patent
Biggs et al.

(10) Number: US 7,467,229 C1
(45) Certificate Issued: Feb. 8, 2011

(54) METHOD AND APPARATUS FOR ROUTING OF NETWORK ADDRESSES

(75) Inventors: Brent Biggs, Des Moines, WA (US); Jason Rudolph, Seattle, WA (US)

(73) Assignee: Direct Route, LLC, Seattle, WA (US)

Reexamination Request:
No. 90/010,981, May 5, 2010

Reexamination Certificate for:
Patent No.: 7,467,229
Issued: Dec. 16, 2008
Appl. No.: 11/868,220
Filed: Oct. 5, 2007

Related U.S. Application Data

(63) Continuation of application No. 11/765,961, filed on Jun. 20, 2007, now abandoned.

(51) Int. Cl.
*G06F 15/16* (2006.01)

(52) U.S. Cl. .......................... 709/242; 370/392; 726/15
(58) Field of Classification Search ........................ None
See application file for complete search history.

(56) References Cited

U.S. PATENT DOCUMENTS

2004/0218611 A1  11/2004  Kim

OTHER PUBLICATIONS

NetHeaven, *Network Tunnels*, http://web.archive.org/web/20010813143309/http://www.netheaven.com/Tunnel.html, Aug. 13, 2001.

Netgear, Inc., *Reference Guide or the Model RT311 and RT314 Internetl Access Gateway Routers*, Jun. 2000.

*Primary Examiner*—Andrew L Nalven

(57) ABSTRACT

Methods and apparatuses for a management console to configure a router and one or more servers to route and bind network addresses respectively are described herein. In various embodiments, the management console may configure one or more servers of one or more local area networks, each of the one or more servers coupled to the management console, to route one or more network addresses to a router remotely disposed from the one or more servers, the routing to be through one or more networking tunnels through one or more networks correspondingly coupling the one or more servers to the router communicatively. Also, in some embodiments, the management console may configure the router to route the one or more network addresses to at least one recipient server coupled to the router for binding to the at least one recipient server, the at least one recipient server being also remotely disposed from the one or more servers.

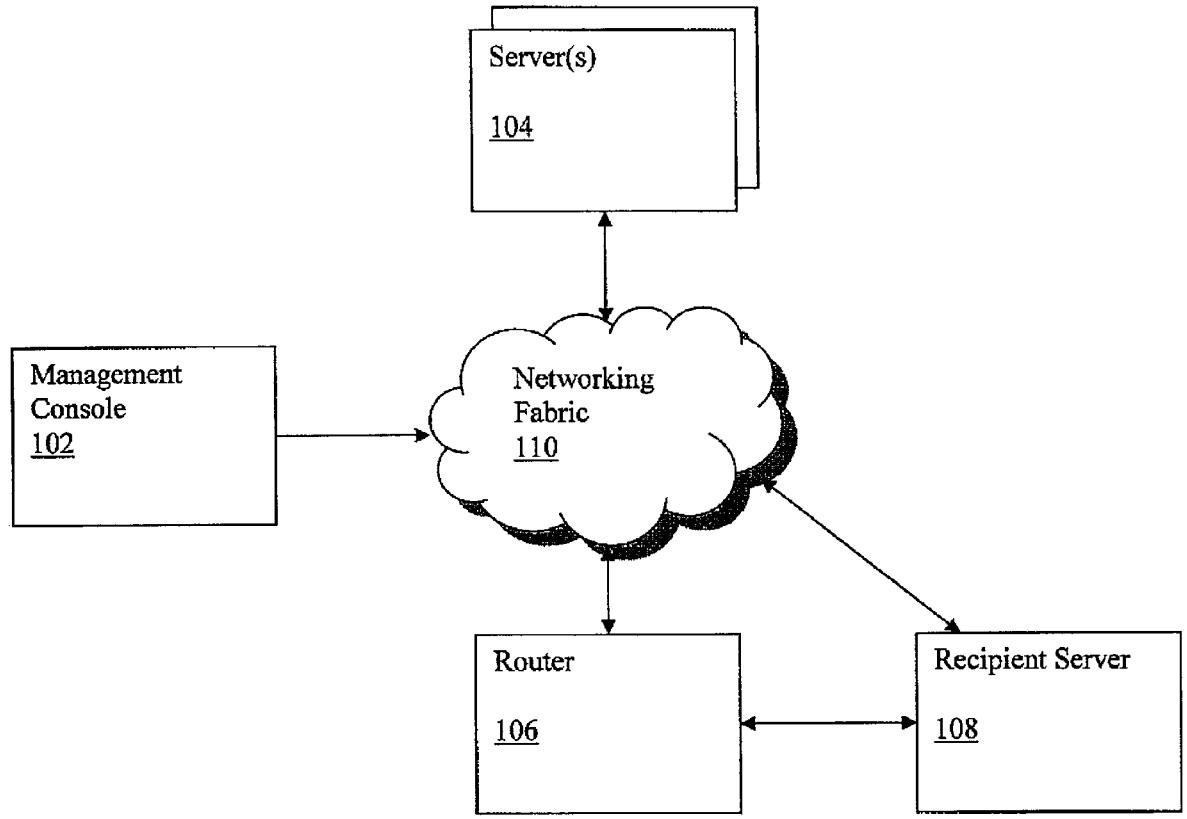

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-8 is confirmed.

* * * * *

(12) INTER PARTES REEXAMINATION CERTIFICATE (0359th)
United States Patent
Biggs et al.

(10) Number: US 7,467,229 C2
(45) Certificate Issued: Mar. 20, 2012

(54) METHOD AND APPARATUS FOR ROUTING OF NETWORK ADDRESSES

(75) Inventors: Brent Biggs, Des Moines, WA (US); Jason Rudolph, Seattle, WA (US)

(73) Assignee: Direct Route, LLC, Seattle, WA (US)

Reexamination Request:
No. 95/001,505, Feb. 11, 2011
No. 90/010,851, Feb. 8, 2010

Reexamination Certificate for:
Patent No.: 7,467,229
Issued: Feb. 8, 2011
Appl. No.: 11/868,220
Filed: Oct. 5, 2007

Reexamination Certificate C1 7,467,229 issued Dec. 16, 2008

Related U.S. Application Data

(63) Continuation of application No. 11/765,961, filed on Jun. 20, 2007.

(51) Int. Cl.
*G06F 15/16* (2006.01)

(52) U.S. Cl. .......................... 709/242; 370/392; 726/15

(58) Field of Classification Search ....................... None
See application file for complete search history.

(56) References Cited

To view the complete listing of prior art documents cited during the proceedings for Reexamination Control Numbers 90/010,851 and 95/001,505, please refer to the USPTO's public Patent Application Information Retrieval (PAIR) system under the Display References tab.

*Primary Examiner* — Minh Dieu Nguyen

(57) ABSTRACT

Methods and apparatuses for a management console to configure a router and one or more servers to route and bind network addresses respectively are described herein. In various embodiments, the management console may configure one or more servers of one or more local area networks, each of the one or more servers coupled to the management console, to route one or more network addresses to a router remotely disposed from the one or more servers, the routing to be through one or more networking tunnels through one or more networks correspondingly coupling the one or more servers to the router communicatively. Also, in some embodiments, the management console may configure the router to route the one or more network addresses to at least one recipient server coupled to the router for binding to the at least one recipient server, the at least one recipient server being also remotely disposed from the one or more servers.

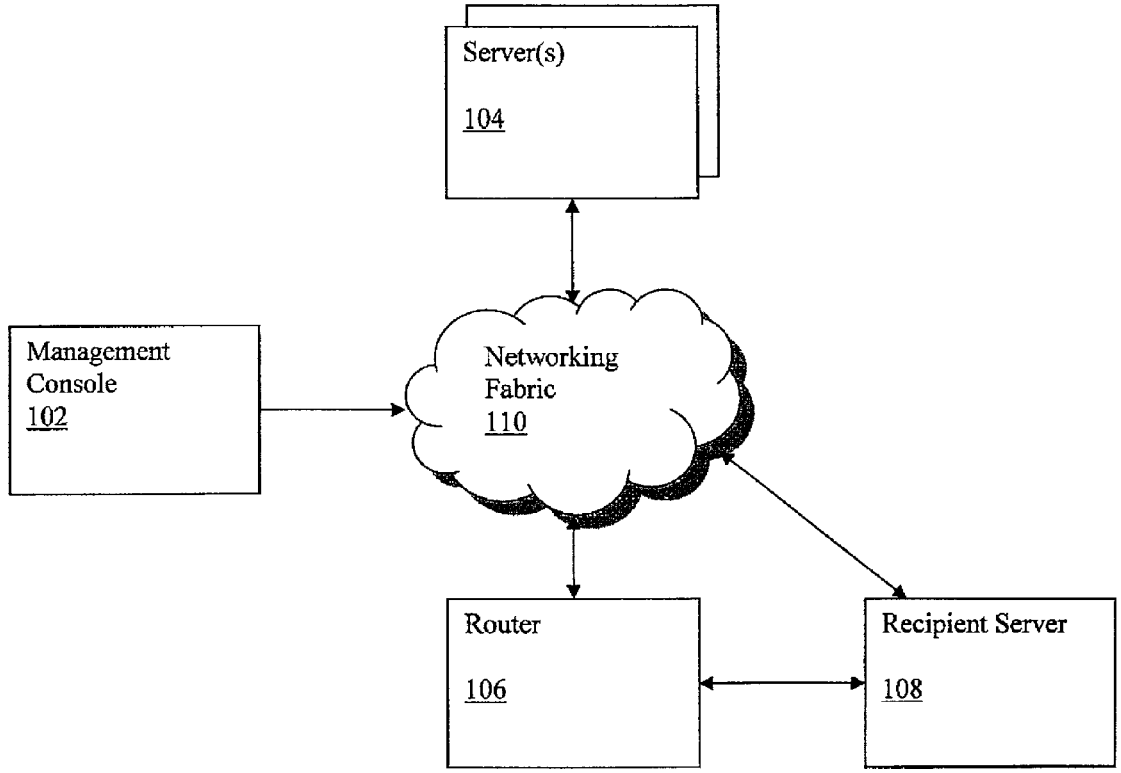

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*